United States Patent
Rothman et al.

(10) Patent No.: US 7,181,293 B2
(45) Date of Patent: Feb. 20, 2007

(54) SYSTEM AND METHOD FOR ENABLING HOME POWER MANAGEMENT

(75) Inventors: Michael A. Rothman, Payallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 8 days.

(21) Appl. No.: 11/024,127

(22) Filed: Dec. 27, 2004

(65) Prior Publication Data

US 2006/0142900 A1 Jun. 29, 2006

(51) Int. Cl.
*G05B 11/01* (2006.01)
*G05D 11/00* (2006.01)
*G06F 1/00* (2006.01)
*G06F 11/30* (2006.01)

(52) U.S. Cl. ............................ 700/22; 700/19; 700/20; 700/291; 700/295; 702/60; 702/61; 702/62; 702/63; 713/300; 713/310; 713/340; 209/223; 209/224; 209/226

(58) Field of Classification Search .................. 700/19, 700/20, 22, 291, 295, 286; 209/223, 224, 209/226; 702/60, 61, 62, 63; 713/300, 310, 713/340
See application file for complete search history.

(56) References Cited

U.S. PATENT DOCUMENTS

| 5,128,855 | A * | 7/1992 | Hilber et al. .................. 700/3 |
| 5,572,438 | A * | 11/1996 | Ehlers et al. ............... 700/295 |
| 5,694,335 | A * | 12/1997 | Hollenberg .................. 726/16 |
| 6,178,362 | B1 * | 1/2001 | Woolard et al. ............ 700/295 |
| 6,523,064 | B1 * | 2/2003 | Akatsu et al. .............. 709/226 |
| 2003/0056125 | A1 * | 3/2003 | O'Conner et al. .......... 713/300 |
| 2004/0139038 | A1 * | 7/2004 | Ehlers et al. ............... 705/412 |
| 2004/0158333 | A1 * | 8/2004 | Ha et al. ....................... 700/3 |

* cited by examiner

*Primary Examiner*—Ramesh Patel
(74) *Attorney, Agent, or Firm*—Crystal D. Sayles

(57) ABSTRACT

A system and method for enabling home power management. The method includes polling a plurality of power managed appliances in a network to determine a power state for each of the power managed appliances. Based on a corresponding power rating for the power state of each of the power managed appliances, determining an overall power utilization for the network. If policy has been enacted for updating the power state of any of the plurality of power managed appliances, adjusting the power state of the power managed appliances to provide an optimized power management network.

28 Claims, 6 Drawing Sheets

SYSTEM AND METHOD FOR ENABLING HOME POWER MANAGEMENT

BACKGROUND OF THE INVENTION

1. Field of the Invention

Embodiments of the present invention are generally related to the field of power management. More particularly, embodiments of the present invention are related to a method for enabling power management in the home.

2. Description

Industry in general is becoming more aware of the digital home initiative and the market place associated it. For example, many manufacturers of consumer appliances are implementing processors in their appliances for controlling the appliances. Today's state of the art for home automation largely deals with programming the appliances to turn on and off at pre-determined dates and/or times. For example, one may program their lights to turn on at 6 a.m. when they awaken and turn off at 8 a.m. when they leave for work/school. With a directive toward controlling appliances in the digital home and a need to conserve power, the ability to manage power profiles for a variety of components in the digital home is of interest.

Thus, what is needed is a system and method for establishing a power management scheme for a digital home. What is also needed is a system and method for establishing a power management scheme for a digital home that takes advantage of existing factors in the home to establish methods which enable the optimization of power managed devices based on a variety of criterion. What is further needed is a system and method for establishing a power management scheme for a digital home that treats the home as a large entity while allowing each appliance in the home to be managed separately.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

Embodiments of the present invention are directed to a system and method for enabling home power management. Embodiments of the present invention may leverage existing features of the home environment, such as, for example, motion detectors that are part of an alarm system in the home, to make appropriate choices for managing power consumption in the home. Embodiments of the present invention enable the home to be treated as a single large entity having a variety of power manageable appliances, giving the homeowner the ability to provide a series of power utilization based metrics to the various power manageable appliances. This enables the system to monitor power usage patterns to inform the homeowner, as well as apply a variety of power compensation schemes or policies to manage the power consumption of the home. With the advent of today's home appliances having the ability to be managed at a variety of power levels, along with the use of a central power management authority, such as a personal computer/controller, embodiments of the invention provide the ability to manage multiple factors to establish optimal power-management schemes for the appliances in the home.

Although embodiments of the present invention are described for a home environment, the invention is not limited to the home environment. One skilled in the relevant art(s) would know that the invention is equally applicable to other environments as well. For example, embodiments of the present invention may also be applicable to an office environment where a central computer is used to manage power for all of the appliances in the office.

Embodiments of the present invention are described as being implemented by leveraging pre-existing motion detectors in home alarm systems. One skilled in the relevant art(s) would know that embodiments of the present invention may also be implemented using detectors/sensors that may be installed in the home for the specific purpose of home power management.

Figure 1:
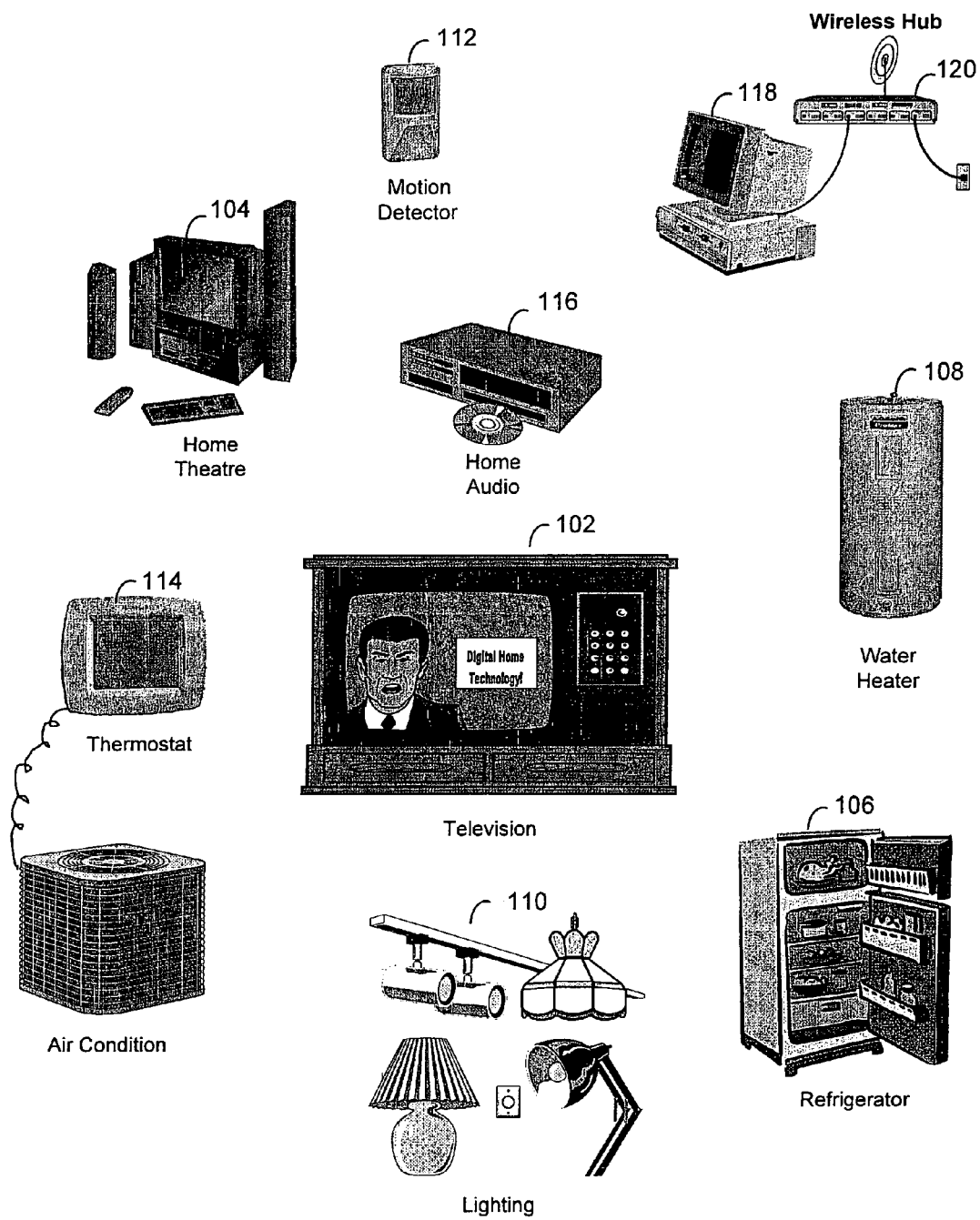
FIG. 1 is a diagram illustrating examples of home appliances that have energy star rated capabilities.

FIG. 1 is a diagram illustrating examples of home appliances that have energy star rated capabilities. In other words, FIG. 1 shows examples of home appliances that have multiple power state awareness or that have the ability to go into low power modes versus the normal on/off modes. Such appliances may include, but are not limited to, a television 102, a home theatre system 104, a refrigerator 106, a water heater 108, a plurality of lights 110 placed throughout the home, a motion detector 112, a thermostat 114 for controlling heating (not shown) and cooling (air conditioner), and a CD (Compact Disc) player 116. Each of these appliances (102, 104, 106, 108, 110, 112, 114, and 116 (also referred to as 102–116)) may be connected to a central power management authority such as central computer/controller 118 to control the appliances in a home network. As shown in FIG. 1, in one embodiment, central computer 118 connects to appliances 102–116 via a wireless hub 120. Wireless hub 120 may connect to appliances 102–116 via a wired or wireless connection in a well known manner. Central computer 118 may talk to appliances 102–116 via wireless hub 120 and appliances 102–116 may talk to central computer 118 via wireless hub 120. Other home appliances that are capable of operating in multiple power states and are capable of connecting to a home network via a wired or wireless connection may also be used.

Figure 1A:
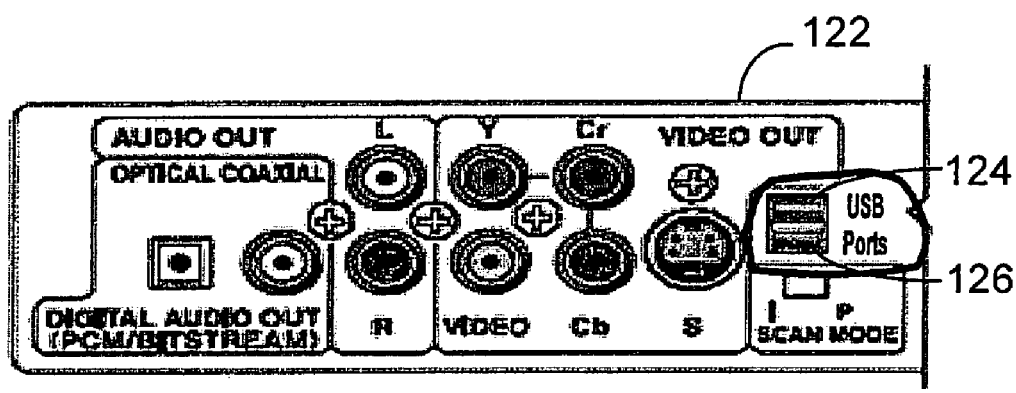
FIG. 1A is a diagram illustrating an example of a rear panel for an energy star rated appliance.

As an example of a wired connection, FIG. 1A shows a view of a rear panel 122 of appliance 116. Rear panel 122 of appliance 116 includes two USB (Universal Serial Bus) ports 124 and 126. USB ports 124 or 126 may be used to connect appliance 116 to central computer 118 via wireless hub 120 to enable central computer 118 to control appliance 116. Alternatively, appliance 116 may include a wireless network interface card (not shown) to allow appliance 116 to communicate with central computer 118 via wireless hub 120.

Figure 2B:
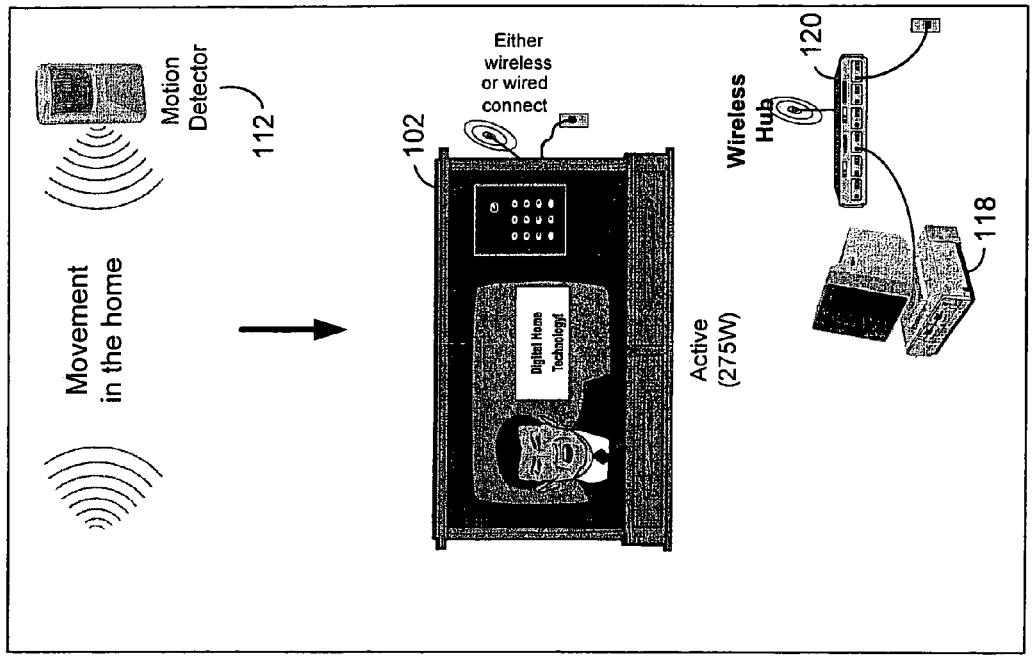
FIGS. 2A and 2B are diagrams illustrating a system for home power management in which the system includes intelligent triggering based on a common component (i.e., a motion detector) according to an embodiment of the present invention.
Figure 2A:
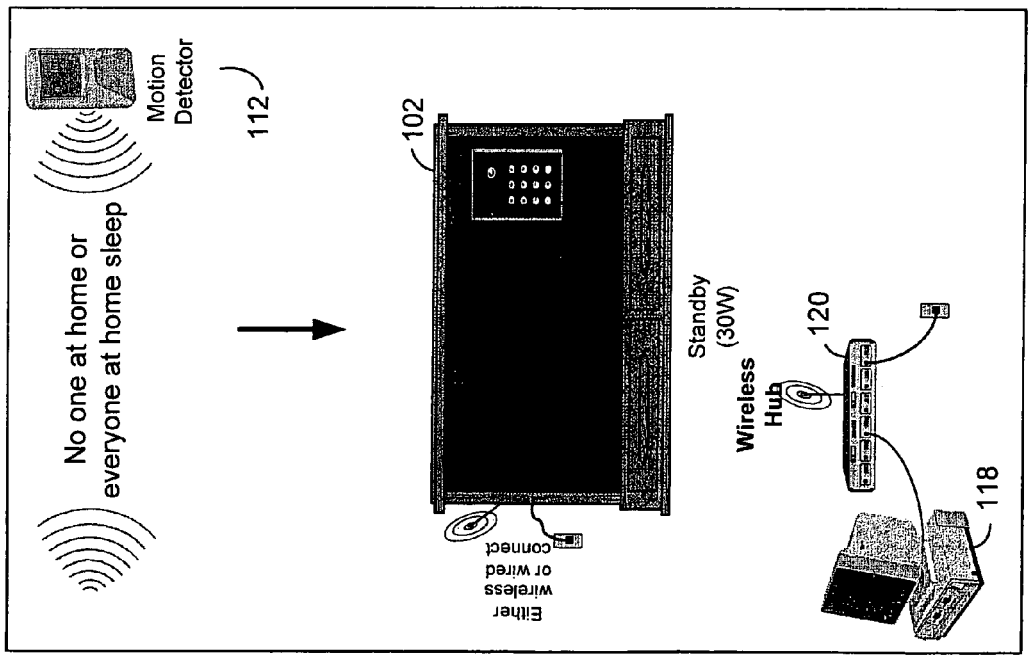

FIGS. 2A and 2B are diagrams illustrating a system for home power management in which the system includes intelligent triggering based on a common component (i.e., a motion detector) according to an embodiment of the present invention. Although FIGS. 2A and 2B are illustrated using only a television, other appliances may also be programmed to operate in different power consumption states based on the intelligent information gathered by motion detector 112. FIGS. 2A and 2B comprise motion detector 112, television 102, and central computer 118 coupled to wireless hub 120. Central computer 118 controls the operation of television 102 based on intelligent information received from motion detector 112. Motion detector 112 and television 102 communicate with central computer 118 via wireless hub 120. A power consumption chart for television 112 is shown in Table 1. Television 112 may be programmed for three different power levels; an ON state, a Standby state, and a Low Standby state. Also shown in Table 1 are power consumption level examples for DVD (Digital Versatile Disc) players and VCRs (Video Cassette Recorders), which may be included in home theatre system 104.

TABLE 1

| Power State | ON | Standby | Low Standby |
|---|---|---|---|
| Power Consumption for Television 112 | 275 W | 30 W | 3 W |
| Power Consumption for DVD player | 11 W | — | 4 W |
| Power Consumption for VCR | 20 W | — | 3 W |

In FIG. 2A, motion detector 112 detects little or no movement within the home environment. In such a scenario, no one may be home or everyone that is home may be asleep. For such a scenario, an owner may want television 102 to be programmed in a standby power state (as shown) or a low standby power state. As shown in Table 1, in the standby power state, television 102 has a power consumption of 30 W and in a low standby power state, television 102 has a power consumption of 3 W.

In FIG. 2B, motion detector 112 detects movement within the home environment. In such a scenario, an owner may want to program television 102 to be in an ON state, as shown, or in a standby state. As shown in Table 1, in the ON state, television 102 has a power consumption of 275 W. In the standby state, television 102 has a power consumption of 30 W.

Thus, an owner may only want television 102 to be in an ON state if someone is actually watching television 102 and to be in a standby state if a lot of movement is sensed by motion detector 112, yet no one is actually watching television 102. This will enable the owner to conserve a lot of power. For example, the difference in power consumption between the ON state and the standby state is 245 W and the difference in power consumption between the ON state and the low standby state is 272 W. Thus, at least 245 W is saved if the television is in the standby state or the low standby state.

Figure 3:
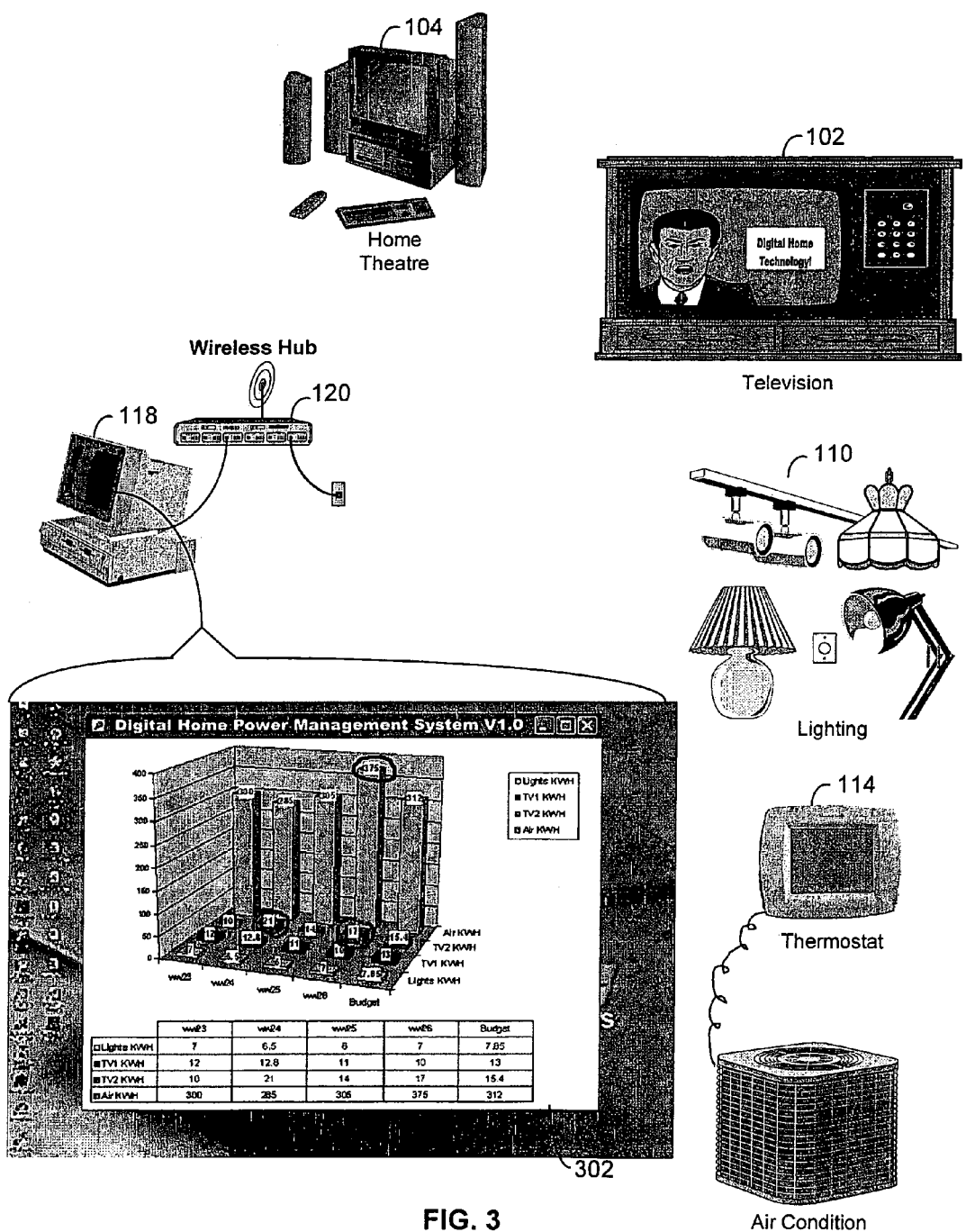
FIG. 3 is a diagram illustrating a power management capability in which an entire home environment is treated as a single power-managed entity according to an embodiment of the present invention.

FIG. 3 is a diagram illustrating a power management capability in which an entire home environment is treated as a single power-managed entity according to an embodiment of the present invention. FIG. 3 shows a chart 302 displayed on central computer 118 for providing a power consumption metric for the appliances in the home. In the embodiment shown in FIG. 3, the home environment includes central computer 118 controlling appliances such as, for example, lights 110, home theatre system 104 (referred to as TV1 in graph 302), television 102 (referred to as TV2 in graph 302), and thermostat 114 for controlling the air condition unit (referred to as Air in graph 302). In this embodiment, a homeowner may apply a plurality of power management schemes to the home appliances. For example, the homeowner may set a power maintenance budget for each appliance on a weekly basis in order to maintain a certain power usage for the home on a monthly basis. In order to do this, the home is treated as a single entity to allow the owner to provide a series of power utilization based metrics to the various appliances in the home. The owner may provide a plurality of instructions for each appliance in the home based on appliance profiles, environmental behaviors, and activity behaviors of the inhabitants of the home. Central computer/controller 118 monitors the usage patterns and may apply a variety of power compensation schemes, developed by the owner or embedded as default selections within the system, to possibly lower the power consumption in the home to avoid exceeding the monthly power maintenance budget. The compensation schemes may include policies, generated from the instructions, for each appliance based on a plurality of circumstances and criterion. For example, a television may have a different set of policies than a refrigerator.

As shown in chart 302, when an item has exceeded the budget for the week, the system may compensate for that item in the following week to keep within the monthly budget. For example, if the motion detector has not been activated within the last thirty (30) minutes, indicating no movement within the home, the policy may be to set all televisions and lights to a low standby state. In one example, the power consumption for TV2 during week 24 is shown as 21 KWH. The weekly budget for TV2 is shown set at 15.4 KWH. Thus, the power consumption for TV2 exceeded its weekly budget metric of 15.4 KWH by 5.6 KWH. Although the power consumption for TV2 was exceeded, the power consumption for the air conditioning unit was below the weekly budget of 312 KWH by 27 KWH. Thus, the weekly budget was not exceeded. In week 25, the system compensated for the power consumption of TV2 by using 1.4 KWH less than the budget metric.

As shown in graph 302, the item consuming the largest amount of power is the air conditioning unit. Thus, in one or more power compensation schemes or policies, the homeowner may have a policy to cool the house to a higher temperature, such as, for example, 80 degrees, when no one is home and begin to ramp the temperature down to a cooler temperature, such as, for example, 75 degrees, when people enter the home (which may be sensed by motion detector 112). In another embodiment, the homeowner may wish to begin ramping the temperature down approximately a predetermined amount of time before anyone is due home. Also, on really hot weeks where it is necessary to run the air conditioning unit at cooler levels, the system may lower the light settings in the rooms (which tend to generate heat) to lower the power consumption for the week and to aid in keeping the rooms cooler in the house. Also, the televisions may be set to run at low standby power consumption unless someone is actually watching the television. The system also allows a homeowner to track the power usage of a variety of appliances in the home. Thus, the embodiment shown in FIG. 3 is by no means a limitation on the configurability of the system. Other scenarios for home power management may also be accomplished with embodiments of the invention.

Figure 4:
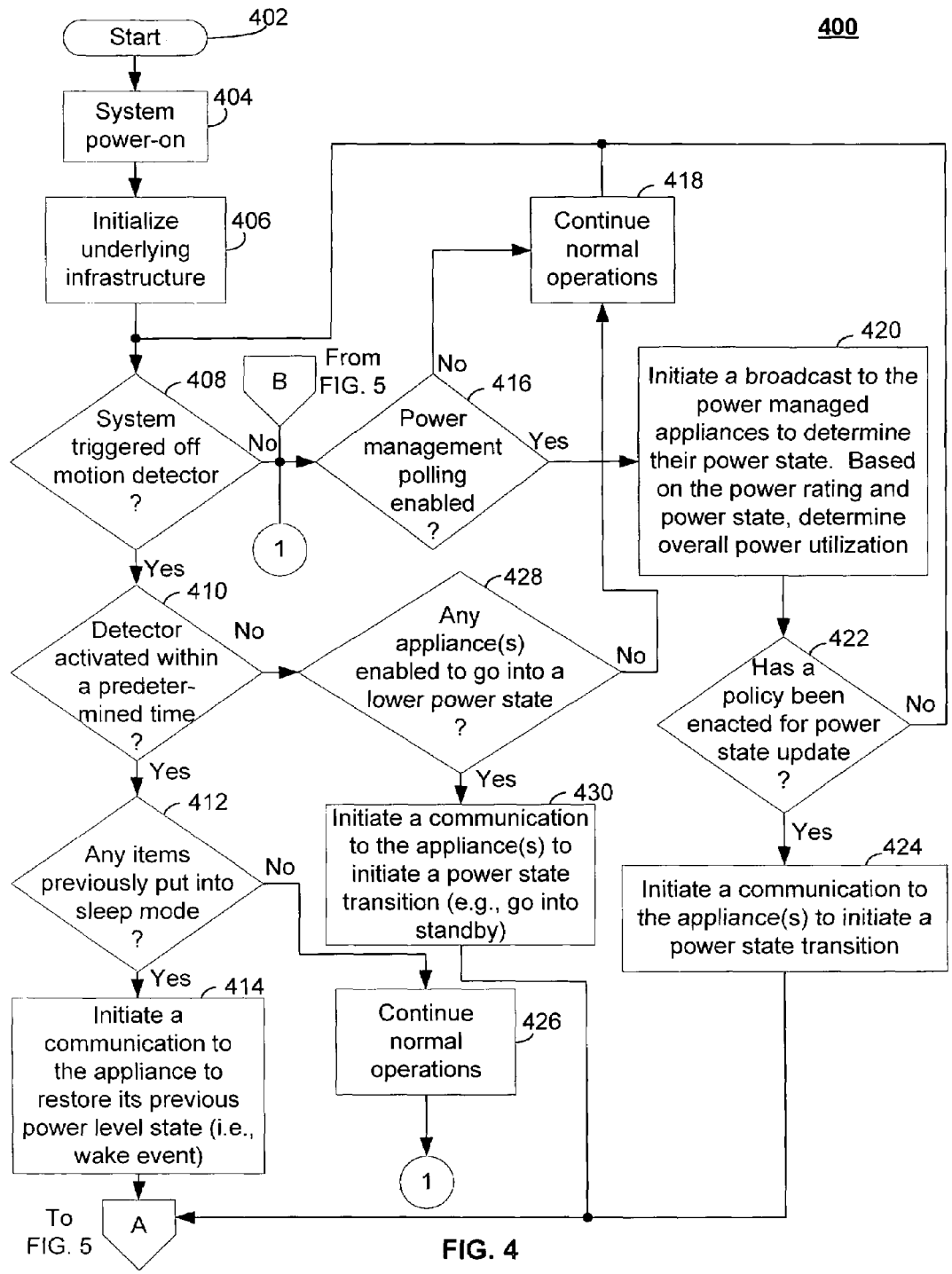
FIG. 4 is a flow diagram describing an exemplary method for enabling home power management according to an embodiment of the present invention.

FIG. 4 is a flow diagram 400 describing an exemplary method for enabling home power management according to an embodiment of the present invention. The invention is not limited to the embodiment described herein with respect to flow diagram 400. Rather, it will be apparent to persons skilled in the relevant art(s) after reading the teachings provided herein that other functional flow diagrams are within the scope of the invention. The process begins with block 402, where the process immediately proceeds to block 404.

In block 404, a central computer (also referred to as a central controller) powers on. Powering on the central computer causes the firmware to initialize the underlying infrastructure (e.g., power management program and other application programs) in block 406. The process then proceeds to decision block 408.

As previously indicated, if a motion detector is used in the system, the motion detector may affect some of the power management policies that the owner may engender. Therefore, in decision block 408, it is determined whether the system has employed a motion detector to trigger certain management policies. If it is determined that the system has employed a motion detector to trigger certain management policies, then the process proceeds to decision block 410.

In decision block 410, it is determined whether the motion detector has been activated within a predetermined time period. In an embodiment, the predetermined time period may be a default time or a time determined by the homeowner. For example, in one embodiment, the owner may set the predetermined time period to thirty (30) minutes. In another embodiment, the owner may set the predetermined time to sixty (60) minutes or ninety (90) minutes. Yet, in another embodiment, the owner may set the predetermined time period to be two hours. If the motion detector has been activated within the predetermined time period, indicating that the motion detector has detected some movement in the home within the predetermined time period, the process proceeds to decision block 412.

In decision block 412, it is determined whether any of the appliances were previously put into a low power (or sleep) mode. If any of the appliances were not put into a low power (or sleep) mode, the process proceeds to block 426. In block 426, the central computer continues its normal operations and the process proceeds to decision block 416, described below.

Returning to decision block 412, if it is determined that there are appliances that were previously put into a low power (or sleep) mode, the process then proceeds to block 414. In block 414, a communication is initiated to the appliance(s) to restore its previous power level. In other words, the appliance(s) is awakened or restored to full power or an intermediate power level. The process then proceeds to decision block 508 in FIG. 5, which is described below, to adjust the power state of the appliance(s).

Returning to decision block 410, if it is determined that the motion detector has not been activated within the predetermined time period, indicating that no movement has occurred within the predetermined time period, the process then proceeds to decision block 428. In decision block 428, it is determined whether any of the appliances in the home network are enabled to go into a lower power state. In one example, if there has been no movement in the home within a 30 minute time period, the owner may establish a policy to turn off all lights and all televisions. In another example, if there has been no movement in the home within a two (2) hour period, then the policy may be to turn down the air conditioner. If any of the appliances in the home network may go into a lower power state, then the process proceeds to block 430.

In block 430, a communication is initiated to the appliance(s) to cause the appliance(s) to transition into a lower power state. The process then proceeds to decision block 508 in FIG. 5, discussed below, to adjust the power state of the appliance(s).

Returning to decision block 428, if it is determined that there are no appliances that need to transition to a lower power state, the process proceeds to block 418. In block 418, the central computer will continue operating in its normal capacity, and the process proceeds back to decision block 408.

Returning to decision block 408, if it is determined that the system has not employed a motion detector to trigger certain management policies, the process proceeds to decision block 416.

In decision block 416, it is determined whether the system will be polling for power management. If it is determined that the system will not be polling for power management, then the process proceeds to block 418. In block 418, if the central computer has not been enabled to control the power management of the home, the central computer will continue its normal operations and the process proceeds back to decision block 408.

Returning to decision block 416, if it is determined that the system will be polling for power management, the process proceeds to block 420. In block 420, a broadcast is initiated to all of the power-managed appliances to determine their power state. In other words, a query is sent to each appliance being controlled by the central computer to obtain their current power consumption state and power rating. Based on the power rating and power state, the central computer may then determine the overall power utilization. The process then proceeds to decision block 422.

In decision block 422, it is determined whether any policies have been enacted, such as, for example, time or power budget policies, to cause any power state updates for any of the appliances. Since motion detectors are not used as leverage, time may be used to enact certain policies. There are a variety of profiles and behaviors that may be modeled to enact various policies for the controlled appliances. For example, an owner may want to begin powering certain appliances to a lower power state at 10 p.m. during weekdays and at midnight during weekends. In another example, an owner may enact a policy to have certain appliances, such as televisions, in a low power state during the hours of 9 a.m. to 3 p.m. when no one is home and to transition to a full power state after 3 p.m. when someone will be home. If it is determined that policies have been enacted to cause power state updates for any of the appliances, then the process proceeds to block 424.

In block 424, a communication is initiated to the appliance(s) to enable the appliance(s) to transition power states accordingly. The process then proceeds to decision block 508 in FIG. 5, described below, to adjust the power state of the appliance(s).

Returning to decision block 422, if it is determined that no policies exist to cause power state updates, then the process proceeds back to decision block 408.

Figure 5:
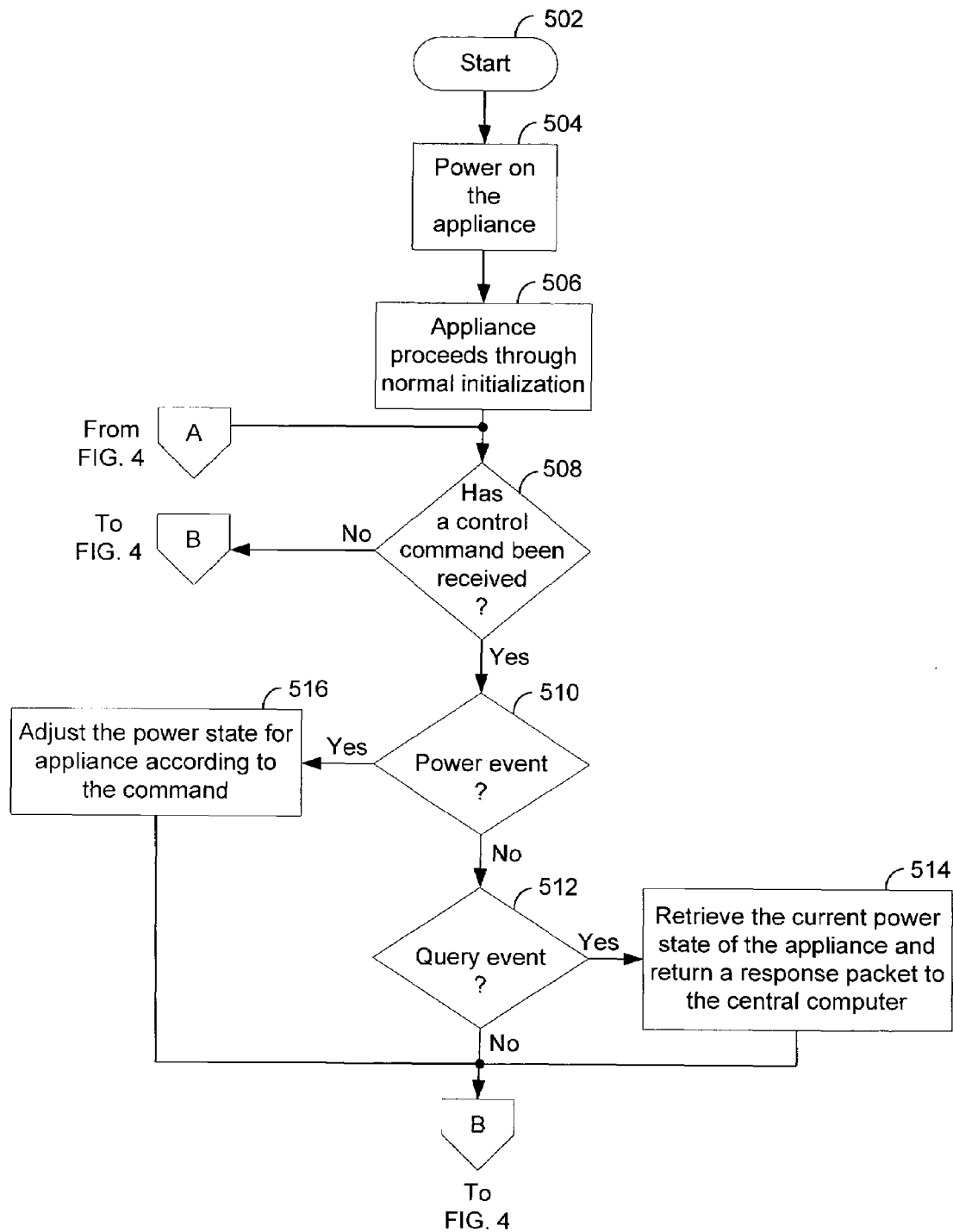
FIG. 5 is a flow diagram describing an exemplary method for controlling appliances in a home power management system according to an embodiment of the present invention.

FIG. 5 is a flow diagram 500 describing an exemplary method for controlling appliances in a home power management system according to an embodiment of the present invention. The invention is not limited to the embodiment described herein with respect to flow diagram 500. Rather, it will be apparent to persons skilled in the relevant art(s) after reading the teachings provided herein that other functional flow diagrams are within the scope of the invention. The process begins with block 502, where the process immediately proceeds to block 504.

In block 504, the appliance is powered on. This occurs when the appliance is plugged into an AC (alternating current) outlet. The process then proceeds to block 506.

In block 506, the appliance proceeds through its normal initialization. The process then proceeds to decision block 508.

In decision block 508, it is determined whether a command has been received from the central computer (or central controller). If a command has been received from the central computer, the process proceeds to decision block 510.

In decision block 510, it is determined whether the command is a power event command. A power event command may be a request from the central computer to adjust the power state of an appliance. If the command is a power event command, the process proceeds to block 516.

In block 516, the power state of the appliance is adjusted as requested in the command. The process then proceeds to decision block 416 in FIG. 4, as described above with reference to FIG. 4.

Returning to decision block 510, if it is determined that the command is not a power event command, then the process proceeds to decision block 512. In decision block 512, it is determined whether the command is a query event command. A query event command may be a request from the central computer to report the current power state of an appliance. If the command is a query event command, then the process proceeds to block 514.

In block 514, the current power state and the corresponding power rating for the power state of the appliance is retrieved and a response in the form of a network packet is sent to the central computer. The network packet includes an identification of the appliance, the current power state of the appliance, and the corresponding power rating for the power state of the appliance. The process then proceeds to decision block 416 in FIG. 4, as described above with reference to FIG. 4.

Returning to decision block 512, if the command is determined not to be a query event, the command may be ignored or discarded and the process then proceeds to decision block 416 in FIG. 4, as described above with reference to FIG. 4.

Returning to decision block 508, if it is determined that a command has not been received, then the process proceeds to decision block 416 in FIG. 4, as described above with reference to FIG. 4.

Certain aspects of embodiments of the present invention may be implemented using hardware, software, or a combination thereof and may be implemented in one or more computer systems or other processing systems. In fact, in one embodiment, the methods may be implemented in programs executing on programmable machines such as mobile or stationary computers, personal digital assistants (PDAs), set top boxes, cellular telephones and pagers, and other electronic devices that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that embodiments of the invention may be practiced with various computer system configurations, including multiprocessor systems, minicomputers, mainframe computers, and the like. Embodiments of the present invention may also be practiced in distributed computing environments where tasks may be performed by remote processing devices that are linked through a communications network.

Embodiments of the present invention may also be implemented in a computing system comprising two or more processors, wherein at least one of the processors is an in-band processor and at least one of the processors is an out-of-band processor. The methods performed in such an embodiment may be executed on the out-of-band processor, thereby leaving the in-band processor to perform normal, everyday, computer operations. In one embodiment, the in-band and out-of-band processors may be implemented on the same silicon.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hard-wired logic for performing the methods, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A power management method comprising:
   (a) polling a plurality of power managed appliances in a network to determine a power state for each of the power managed appliances;
   (b) based on a corresponding power rating for the power state of each of the power managed appliances, determining an overall power utilization for the network; and
   (c) if policy has been enacted for updating the power state of any of the plurality of power managed appliances, adjusting the power state of the power managed appliances to provide an optimized power management network, wherein the policy comprises user implemented rules based on appliance profiles, environmental behavior, and activity behaviors of the users.

2. The method of claim 1, wherein if the network includes a motion detector, and the motion detector has been activated within a predetermined time period, restoring a previous power state to any of the plurality of power managed appliances in a low power state if policy dictates and repeating (a)–(c).

3. The method of claim 2, wherein activation of the motion detector within a predetermined time period comprises detecting movement.

4. The method of claim 1, wherein if the network includes a motion detector, and the motion detector has not been activated within a predetermined time period, transitioning from a higher power state to a lower power state any of the plurality of power managed appliances not currently in a low power state if policy dictates and repeating (a)–(c).

5. The method of claim 4, wherein non-activation of the motion detector within a predetermined time period comprises little or no detection of movement.

6. The method of claim 1, wherein the network comprises a home network and wherein the plurality of power managed appliances comprises one or more of a refrigerator, a hot water heater, an air conditioning unit, a heating unit, electrical lighting fixtures, a stereo player, a television, a home theatre system, a video cassette recorder, a digital versatile disc player, and any other appliance having an ability to be managed at a plurality of power levels.

7. The method of claim 1, wherein the network comprises a home network and wherein policy includes owner implemented rules based on appliance profiles, environmental behaviors, and activity behaviors of the inhabitants of a home.

8. The method of claim 1, wherein polling a plurality of power managed appliances in a network to determine a power state for each of the power managed appliances comprises:
   initiating, by a controller, a broadcast to each of the power managed appliances;
   determining, by each of the power managed appliances, whether the broadcast represents a query event command; and
   returning a network packet to the controller if the broadcast represents the query event command, the network packet identifying the power managed appliance, the current power state of the power managed appliance, and the corresponding power rating for the current power state of the power managed appliance.

9. The method of claim 8, wherein the controller comprises a personal computer.

10. The method of claim 8, wherein the controller comprises a personal computer, the personal computer comprising an in-band processor and an out-of-band processor, the out-of-band processor performing the power management method, the in-band processor performing day-to-day operations of a normal personal computer.

11. The method of claim 1, wherein adjusting the power state of the power managed appliances to provide an optimized power management network comprises:
   initiating, by a controller, a communication to any of the plurality of power managed appliances based on a policy rule, wherein the communication represents a power event communication;
   transitioning the power state of any of the plurality of power managed appliances based on the corresponding policy rule, wherein the transitioning of the power state is performed by the power managed appliance.

12. The method of claim 11, wherein the controller comprises a personal computer.

13. The method of claim 11, wherein the controller comprises a personal computer, the personal computer comprising an in-band processor and an out-of-band processor, the out-of-band processor performing the power management method and the in-band processor performing day-to-day operations of a normal personal computer.

14. The method of claim 1, further comprising continuously performing processes (a)–(c).

15. A power management system comprising:
   a plurality of appliances in a home network, each of the appliances capable of being coupled to and remotely controlled by a central power management authority, the central power management authority to establish optimal power management schemes for optimizing power consumption in a home, wherein the central power management authority comprises a personal computer having an in-band processor and an out-of-band processor, the out-of-band processor to perform the optimal power management schemes for optimizing power consumption in the home.

16. The system of claim 15, further comprising:
   a motion detector, the motion detector to trigger a transition of a lower power state to a higher power state of one or more of the appliances when movement is detected for a predetermined period of time.

17. The system of claim 16, wherein the transition of the lower power state to the higher power state of the one or more of the appliances when movement is detected for the predetermined period of time is based on policy rules.

18. The system of claim 15, further comprising:
a motion detector, the motion detector to trigger a transition of a higher power state to a lower power state of one or more of the appliances when no movement is detected for a predetermined period of time.

19. The system of claim 18, wherein the transition of the higher power state to the lower power state of the one or more of the appliances when no movement is detected for the predetermined period of time is based on policy rules.

20. The system of claim 15, wherein the optimal power management schemes comprise owner implemented policy rules based on appliance profiles, environmental behaviors, and activity behaviors of the inhabitants of the home.

21. The system of claim 15, wherein the in-band processor to perform day-to-day operations of a normal home personal computer.

22. An article comprising: a storage medium having a plurality of machine accessible instructions, wherein when the instructions are executed by a processor, the instructions provide for:
(a) polling a plurality of power managed appliances in a network to determine a power state for each of the power managed appliances;
(b) based on a corresponding power rating for the power state of each of the power managed appliances, determining an overall power utilization for the network; and
(c) if policy has been enacted for updating the power state of any of the plurality of power managed appliances, adjusting the power state of the power managed appliances to provide an optimized power management network, wherein the policy comprises user implemented rules based on appliance profiles, environmental behavior, and activity behaviors of the users.

23. The article of claim 22, wherein if the network includes a motion detector, and the motion detector has been activated within a predetermined time period, the instructions further providing for restoring a previous power state to any of the plurality of power managed appliances in a low power state if policy dictates and repeating instructions (a)–(c).

24. The article of claim 22, wherein if the network includes a motion detector, and the motion detector has not been activated within a predetermined time period, the instructions further providing for transitioning from a higher power state to a lower power state any of the plurality of power managed appliances currently not in a low power state if policy dictates and repeating instructions (a)–(c).

25. The article of claim 22, wherein the network comprises a home network and wherein the plurality of power managed appliances comprises one or more of a refrigerator, a hot water heater, an air conditioning unit, a heating unit, electrical lighting fixtures, a stereo player, a television, a home theatre system, a video cassette recorder, a digital versatile disc player, and any other appliance having an ability to be managed at a plurality of power levels.

26. The article of claim 22, wherein the network comprises a home network and wherein policy includes owner implemented rules based on appliance profiles, environmental behaviors, and activity behaviors of the inhabitants of a home.

27. The article of claim 22, wherein instructions for polling a plurality of power managed appliances in a network to determine a power state for each of the power managed appliances further comprises instructions for:
initiating, by a controller, a broadcast to each of the power managed appliances;
determining, by each of the power managed appliances, whether the broadcast represents a query event command; and
returning a network packet to the controller if the broadcast represents the query event command, the network packet identifying the power managed appliance, the current power state of the power managed appliance, and the corresponding power rating for the current power state of the power managed.

28. The article of claim 22, wherein instructions for adjusting the power state of the power managed appliances to provide an optimized power management network comprises instructions for: initiating, by a controller, a communication to any of the plurality of power managed appliances based on a policy rule, wherein the communication represents a power event communication;
transitioning the power state of any of the plurality of power managed appliances based on the corresponding policy rule, wherein the transitioning of the power state is performed by the power managed appliance.

* * * * *